(12) United States Patent
Kim et al.

(10) Patent No.: US 7,518,836 B2
(45) Date of Patent: Apr. 14, 2009

(54) SWITCHING MODE POWER SUPPLY AND METHOD FOR PERFORMING PROTECTION OPERATION THEREOF

(75) Inventors: Jung-Won Kim, Seoul (KR); Joo-Han Yoon, Seoul (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 272 days.

(21) Appl. No.: 11/359,099

(22) Filed: Feb. 22, 2006

(65) Prior Publication Data

US 2006/0209481 A1   Sep. 21, 2006

(30) Foreign Application Priority Data

Feb. 28, 2005   (KR) .................. 10-2005-0016423

(51) Int. Cl.
*H02H 9/00* (2006.01)
(52) U.S. Cl. .................. 361/18; 361/87; 361/93.1; 361/93.7; 363/21.12; 363/21.15; 363/21.16; 363/21.18; 363/56.09; 363/56.11
(58) Field of Classification Search .......... 361/18, 361/87, 90, 91, 93.1, 93.7, 93.9; 363/21.12, 363/21.15, 21.16, 21.18, 56.09, 56.11, 56, 363/56.03, 56.07; 323/282–288
See application file for complete search history.

(56) References Cited

U.S. PATENT DOCUMENTS

| 5,012,401 A | * | 4/1991 | Barlage ................. 363/97 |
| 5,029,269 A | * | 7/1991 | Elliott et al. .............. 363/21.1 |
| 5,122,726 A | * | 6/1992 | Elliott et al. .............. 323/272 |
| 5,917,716 A | * | 6/1999 | Cho ................. 363/21.14 |
| 6,631,064 B2 | * | 10/2003 | Schuellein et al. ......... 361/93.1 |
| 6,813,170 B2 | * | 11/2004 | Yang ................. 363/56.09 |

* cited by examiner

*Primary Examiner*—Stephen W Jackson
*Assistant Examiner*—Terrence R Willoughby
(74) *Attorney, Agent, or Firm*—Sidley Austin LLP

(57) ABSTRACT

A switching mode power supply and a corresponding method of protection operation is presented. A switching controller of the switching mode power supply receives current sensing information corresponding to the current flowing through a main switch and feedback information corresponding to an output voltage through a single terminal, and performs a protection operation when the voltage at the terminal is maintained to be lower than a reference voltage for more than a predetermined time frame. The power supply requires a low number of terminals, while preserving the protection operation function.

15 Claims, 5 Drawing Sheets

SWITCHING MODE POWER SUPPLY AND METHOD FOR PERFORMING PROTECTION OPERATION THEREOF

CROSS REFERENCE TO RELATED APPLICATION

This application claims priority to and the benefit of Korea Patent Application No. 10-2005-0016423 filed on Feb. 28, 2005 in the Korean Intellectual Property Office, the entire content of which is incorporated herein by reference.

BACKGROUND OF THE INVENTION

1. Field of the Invention

The present invention relates to a switching mode power supply (SMPS). More specifically, the present invention relates to a switching mode power supply for performing a protection operation.

2. Description of the Related Art

An SMPS converts a DC voltage into at least one other DC voltage. The DC output voltage can be controlled to be greater or less than the input voltage. The SMPS is applied to power electronic devices, in particular, battery power supply devices such as mobile phones and laptop computers.

In general, the SMPS has a protection circuit to protect the system and to maintain the security thereof against protection operation conditions such as overloads, short circuits, and open loops. When the SMPS has no protection circuit, elements may be damaged because of electrical stress. Therefore, the effective operation of the protection circuit has become increasingly important.

The general SMPS controls the output voltage by sensing the output voltage, receiving information regarding the sensed output voltage at a feedback terminal of a PWM controller, and controlling the turn-on time of a main switch according to the voltage of the feedback terminal. When the above-noted protection operation condition occurs, the voltage at the feedback terminal is saturated. U.S. Pat. No. 5,687,051, which is hereby incorporated in its entirety by reference, discloses a protection circuit of an SMPS in which the voltage at the feedback terminal is saturated under the protection operation condition. In this system, two current sources with different current levels are used to distinguish a long protection operation condition (which indicates that the protection circuit operation condition is maintained) and a short protection operation condition (which indicates that the protection circuit operation condition is not maintained). The protection circuit is controlled to be operable in the case of the long protection operation condition.

However, the system of the U.S. Pat. No. 5,687,051 has a feedback terminal for receiving information on the output voltage from the PWM controller and an additional terminal for sensing and receiving information on the current that flows through the main switch. The use of the additional terminal increases the number of elements which increases complexity and cost.

SUMMARY OF THE INVENTION

Briefly and generally, embodiments of the present invention include a switching mode power supply with a simplified configuration that performs a protection operation.

In some embodiments, a switching mode power supply includes: a power supply including a main switch coupled to a primary coil of a transformer, and supplying power to a secondary coil of the transformer according to an operation by the main switch; a feedback circuit for generating feedback information corresponding to an output voltage output by an output unit including the secondary coil of the transformer; and a switching controller for receiving current sensing information on the current flowing through the main switch and the feedback information through a single terminal, and performing a protection operation when the voltage at the terminal is maintained below a reference voltage for more than a first time period.

In another embodiment, a switching mode power supply includes a power supply including a main switch coupled to a primary coil of a transformer, and supplying power to a secondary coil of the transformer according to an operation by the main switch; a feedback circuit for generating feedback information corresponding to an output voltage output by an output unit including the secondary coil of the transformer; and a switching controller for receiving current sensing information on the current flowing through the main switch and the feedback information through a single terminal, and performing a protection operation when a first period in which a first voltage corresponding to the feedback information is below a reference voltage for more than a predetermined time is maintained.

In another embodiment, a method for performing a protection operation in a switching mode power supply including a main switch coupled to a primary coil of a transformer, a switching controller for controlling the operation of the main switch, and an output unit for outputting a predetermined output voltage according to the operation of the main switch includes measuring current sensing information corresponding to the current flowing through the main switch, and feedback information corresponding to the output voltage; receiving the current sensing information and the feedback information through the same terminal of the switching controller; comparing a voltage at the terminal with a reference voltage, and determining whether a first period in which the voltage at the terminal is lower than the reference voltage is maintained for more than a predetermined time; and performing a protection operation when the first period is determined to be greater than the predetermined time.

BRIEF DESCRIPTION OF THE DRAWINGS

The accompanying drawings, which are incorporated in and constitute a part of the specification, illustrate an embodiment of the invention, and, together with the description, serve to explain the principles of the invention.

FIG. 1 shows a circuit diagram of an SMPS according to an embodiment of the present invention.

FIG. 2A shows a voltage at a terminal of a CS/FB, a gate drive signal (a signal of a terminal OUT), and internal clock signals of a switching controller when a lesser load is given, and FIG. 2B shows a voltage at a terminal of a CS/FB, a gate drive signal (a signal of a terminal OUT), and internal clock signals of a switching controller when a greater load is given.

FIG. 3 shows a circuit for performing a protection circuit operation by a switching controller of an SMPS according to an embodiment of the present invention.

FIGS. 4(*a*)-(*e*) show signals of respective elements in the switching controller of FIG. 3.

FIGS. 5(*a*)-(*d*) show various methods for measuring time for maintaining the protection operation condition.

DETAILED DESCRIPTION

In the following detailed description only some embodiments are shown and described. The scope of the invention is

FIG. 1 shows an embodiment of a switching mode power supply (SMPS). The SMPS includes a power supply 100, an output unit 200, a feedback circuit 300, a switching controller 400, and a Vcc voltage supply 500.

Power supply 100 includes a bridge diode BD for rectifying an AC input, a capacitor Cin for smoothing the rectified voltage, a primary coil L1 of a transformer wherein a first terminal of primary coil L1 is connected to capacitor Cin, a switching MOS transistor Qsw that functions as a main switch and has a drain connected to a second terminal of primary coil L1, and a sense resistor Rsense for sensing the current flowing through the switching MOS transistor Qsw. Sense resistor Rsense is connected between a source of switching MOS transistor Qsw and the ground. A gate of switching MOS transistor Qsw is connected to an output terminal OUT of switching controller 400. In this embodiment a MOSFET is used as switching MOS transistor Qsw, but in other embodiments other types of switches can be employed.

Power supply 100 converts an AC voltage into a DC voltage Vin by the bridge diode BD and the capacitor Cin. Power supply 100 induces an adjustable power in the secondary coil of the transformer of output unit 200. The induced power can be adjusted by varying the duty of switching MOS transistor Qsw.

Output unit 200 includes a diode D1 having an anode connected to a first terminal of a secondary coil L2 of the transformer, and a capacitor C1 connected between a cathode of diode D1 and the ground. A second terminal of secondary coil L2 is grounded. The voltage at capacitor C1 is referred to as output voltage Vout.

Feedback circuit 300 includes a resistor R3 having a first terminal connected to the cathode of diode D1, a resistor R4 connected between a second terminal of a resistor R3 and the ground, a shunt regulator 320 having a reference terminal R connected to a second terminal of resistor R3 and an anode terminal A connected to the ground, a capacitor C3 having a first terminal connected to the second terminal of resistor R3 and a second terminal connected to a cathode terminal K of shunt regulator 320, a resistor R5 having a first terminal connected to the cathode of diode D1, a photodiode PC1 having an anode connected to a second terminal of resistor R5 and a cathode connected to the cathode terminal K of shunt regulator 320, and a phototransistor PC2 connected between the terminal Vcc of switching controller 400 and resistor R2. Photodiode PC1 and phototransistor PC2 form a photocoupler PC. Shunt regulator 320 may include integrated circuit, for example KA431, KA431A, and KA431L ICs. The voltage at the reference terminal R maintains a constant reference voltage of Vref_s.

During regular operations, a current I1 flowing through resistor R3 corresponds to a current I2 flowing through resistor R4, and a current I3 flowing through capacitor C3 is accordingly 0. Since the voltage of Vref_s is constant as described, current I3 flowing through capacitor C3 is generated when the output voltage Vout is varied. Current I3 flows in the positive direction when the output voltage Vout increases, and current I3 flows in the negative direction when the output voltage Vout decreases.

When output voltage Vout increases and current I3 flows in the positive direction, the voltage at the cathode terminal K of shunt regulator 320 becomes Vref_s−VC3, where VC3 is the voltage of capacitor C3. Thus, the voltage across resistor R5 increases. This voltage is coupled back to a feedback capacitor Cfb through a photocoupler PC and a resistor R2 as a voltage VCS/FB. When the voltage across resistor R5 increases, voltage VCS/FB of feedback capacitor Cfb increases as well.

When output voltage Vout decreases and current I3 flows in the negative direction, the voltage at the cathode terminal K of shunt regulator 320 becomes Vref_s+VC3. Therefore, the voltage at resistor R5 decreases and the voltage VCS/FB of the feedback capacitor Cfb decreases. Switching controller 400 controls the duty of the switching MOS transistor Qsw to regulate output voltage Vout through voltage VCS/FB at feedback capacitor Cfb corresponding to output voltage Vout transmitted by feedback circuit 300.

The above-described configuration of feedback circuit 300 for feeding information regarding output voltage Vout back to switching controller 400 is only one of many possible embodiments.

Vcc voltage supply 500 includes a secondary coil L3 of the transformer, a diode D2 having an anode connected to a first terminal of secondary coil L2 and a cathode connected to a terminal Vcc of switching controller 400, and a capacitor C2 connected between the cathode of diode D2 and secondary coil L3. Vcc voltage supply 500 supplies a voltage Vcc for biasing switching controller 400 when switching MOS transistor Qsw performs switching.

Switching controller 400 receives "current sensing information" regarding the current that flows through the switching MOS transistor Qsw from a terminal CS/FB through resistor R1. Switching controller 400 also receives "feedback information" regarding output voltage Vout at terminal CS/FB through resistor R2 of feedback circuit 300. Feedback capacitor Cfb is connected between terminal CS/FB of switching controller 400 and the ground. Switching controller 400 receives the current sensing information and the feedback information at terminal CS/FB, and determines whether to turn the switching MOS transistor Qsw on or off according to voltage VCS/FB of the terminal CS/FB. Switching controller 400 also performs a protection operation based on voltage VCS/FB.

A method for performing a protection circuit operation by the SMPS, in which switching controller 400 turns on/off switching MOS transistor Qsw will now be described with reference to FIG. 2A and FIG. 2B.

Figure 1:
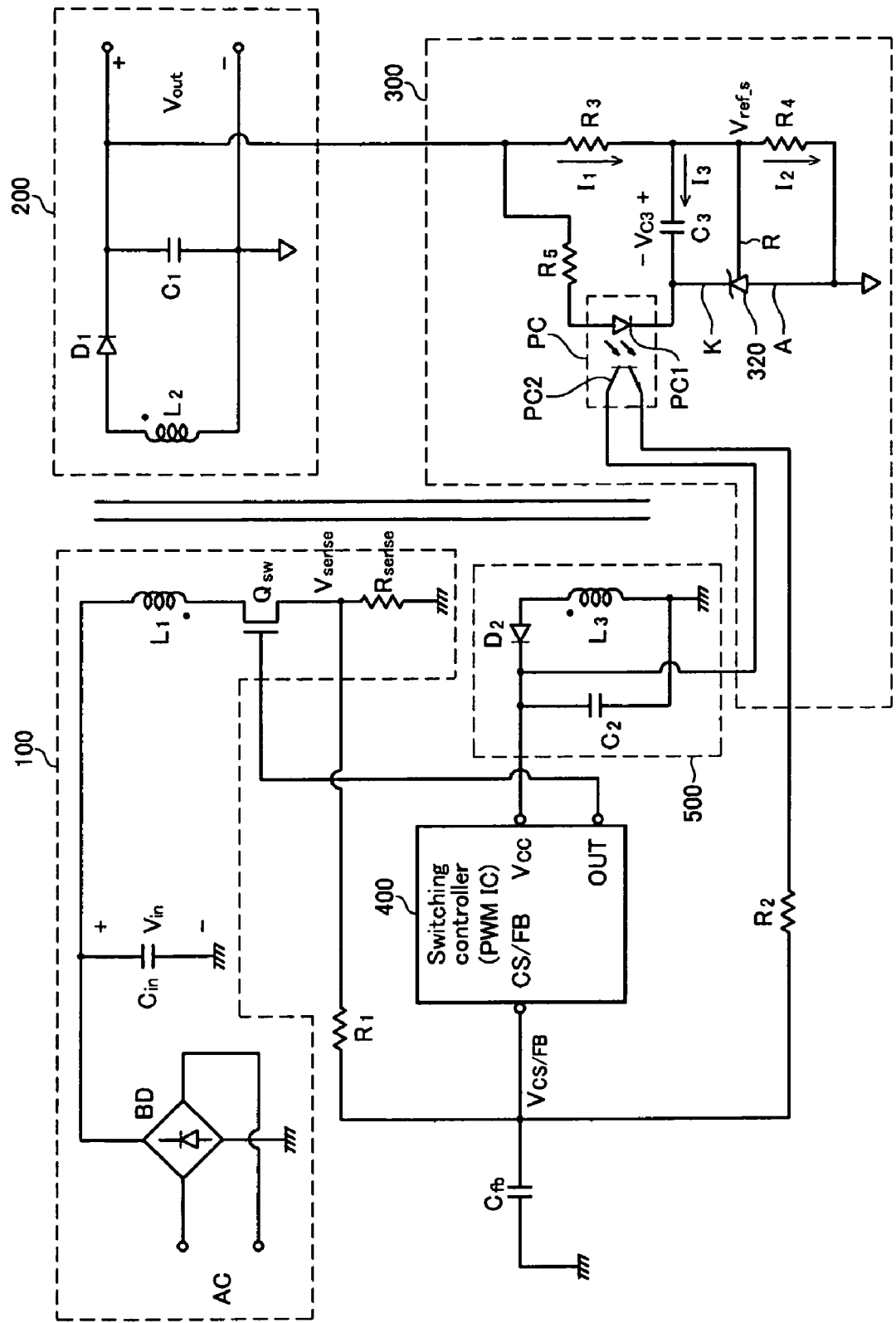
Figure 2A:
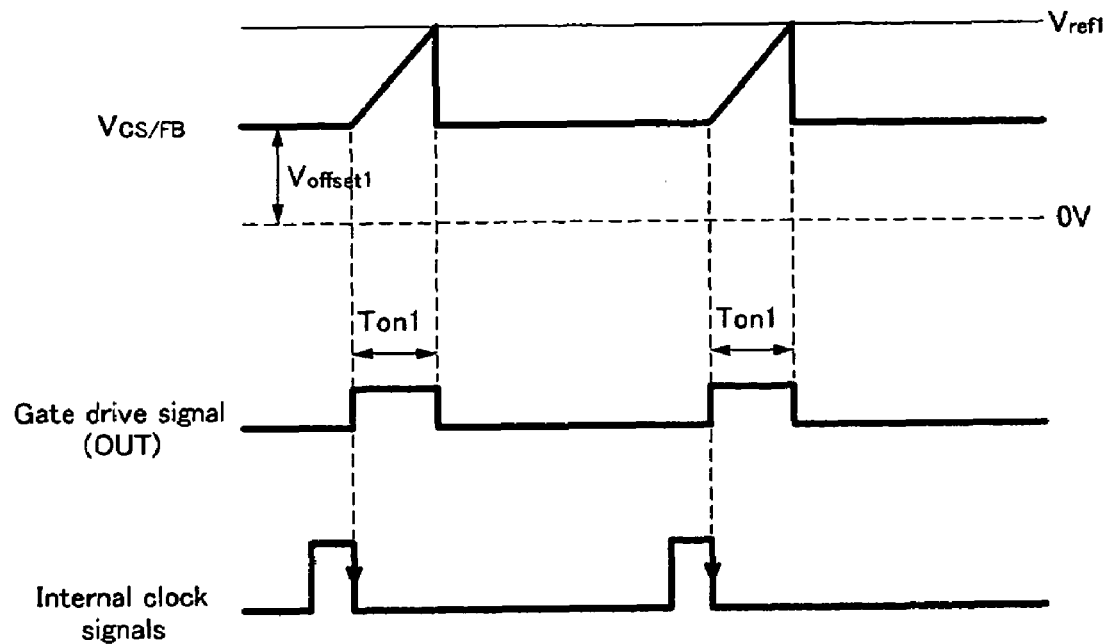
FIG. 2A shows voltage VCS/FB at terminal CS/FB, a gate drive signal (a signal of a terminal OUT), and internal clock signals of switching controller 400 for a smaller load.

Referring to FIG. 2A, switching MOS transistor Qsw is turned on at the falling edge of the internal clock signal of switching controller 400. The waveform of voltage VCS/FB at terminal CS/FB is generated by adding a constant offset voltage Voffset1 and a sawtooth waveform voltage. Offset voltage Voffset1 corresponds to the feedback information. Sawtooth waveform voltage corresponds to the current sensing information. Switching controller 400 has an internal reference voltage Vref1 for turning off switching MOS transistor Qsw by outputting a low signal at terminal OUT when voltage VCS/FB rises from offset voltage Voffset1 to reach internal reference voltage Vref1. A turn-on time Ton1 of switching MOS transistor Qsw is accordingly determined as shown in FIG. 2A.

Details of the method for turning on switching MOS transistor Qsw by switching controller 400 using the internal clock signals, details of the method for turning off switching MOS transistor Qsw by comparing voltage VCS/FB and reference voltage V_ref1, and details of the corresponding circuitry are well known to a person skilled in the art, thus no corresponding descriptions thereof need to be provided.

Figure 2B:
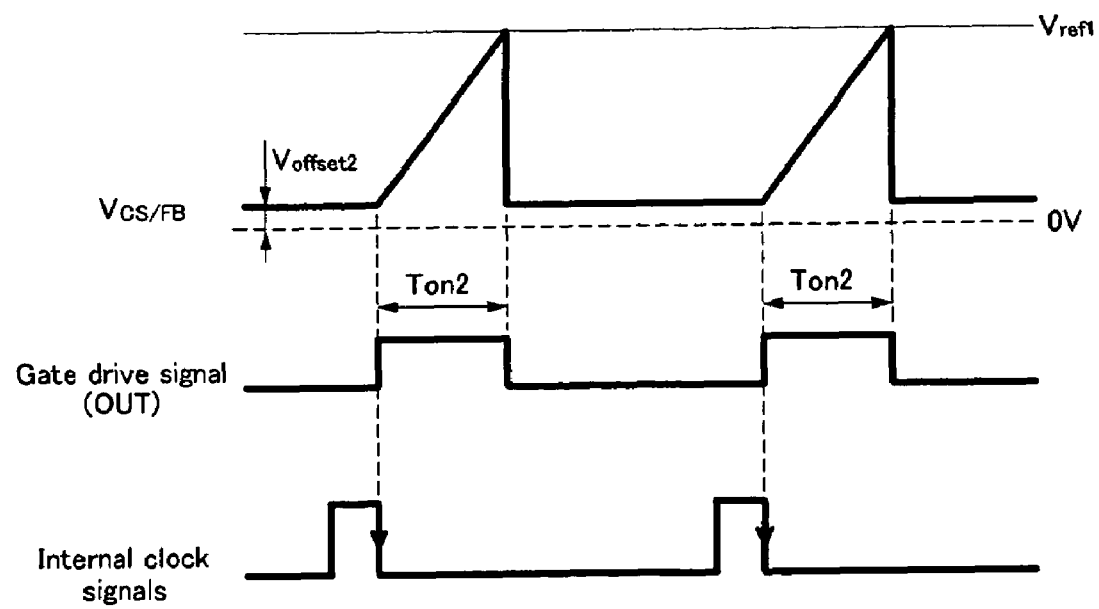
FIG. 2B shows voltage VCS/FB at terminal CS/FB, gate drive signal and internal clock signals of switching controller 400 for a greater load.

Offset voltage Voffset varies depending on the feedback information of output voltage Vout. When output voltage Vout increases, the current flowing through phototransistor PC2 of photocoupler PC increases. Hence the voltage of capacitor Cfb increases, increasing offset voltage Voffset. When output voltage Vout decreases (e.g. when the output load increases), offset voltage Voffset is reduced to Voffset2 as shown in FIG. 2B. Since the slope of the sawtooth waveform is held constant by the inductance of the primary coil L1, when offset voltage Voffset is reduced to Voffset2, the time Ton2 for voltage VCS/FB to reach internal reference voltage Vref1 increases.

As described with reference to FIG. 2A and FIG. 2B, switching controller 400 reduces turn-on time Ton to reduce output voltage Vout when the load is reduced and output voltage Vout is high, and it increases turn-on time Ton to increase output voltage Vout when the load is increased and output voltage Vout is low. This feedback action generates an approximately steady output voltage Vout for output unit 200.

When the SMPS is in the protection operation condition such as an overload state, a short circuit state, or an open loop state, offset voltage Voffset almost reaches 0V. The SMPS performs the protection operation by reacting to offset voltage Voffset approaching zero.

A method for the SMPS to perform a protection operation according to an embodiment will now be described with reference to FIGS. 3-5.

Figure 3:
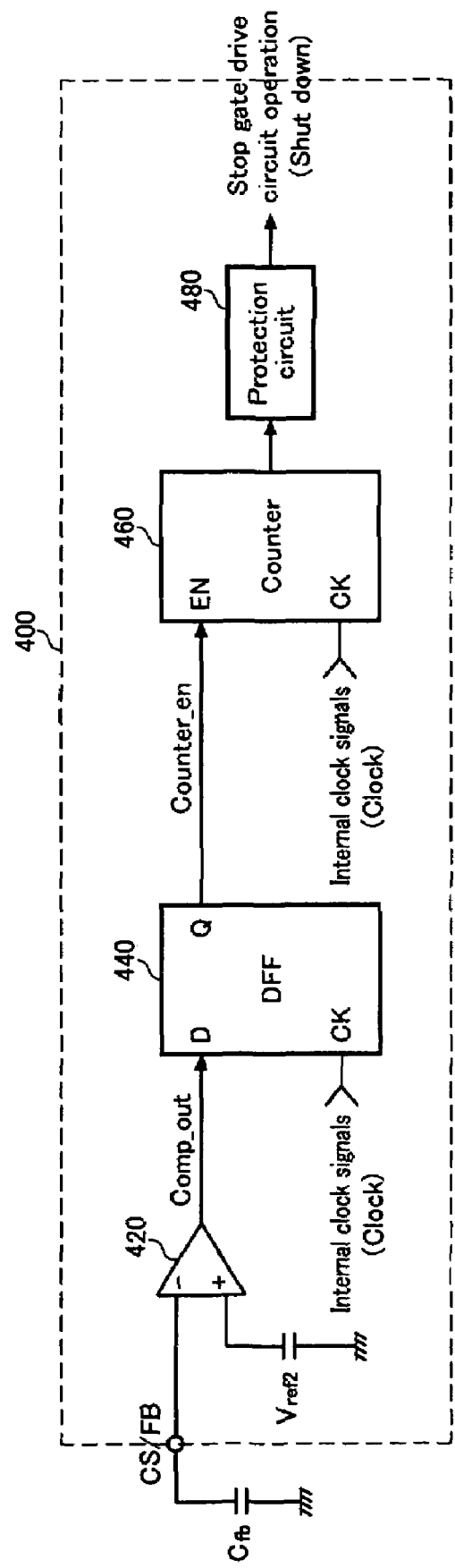
Figure 4:
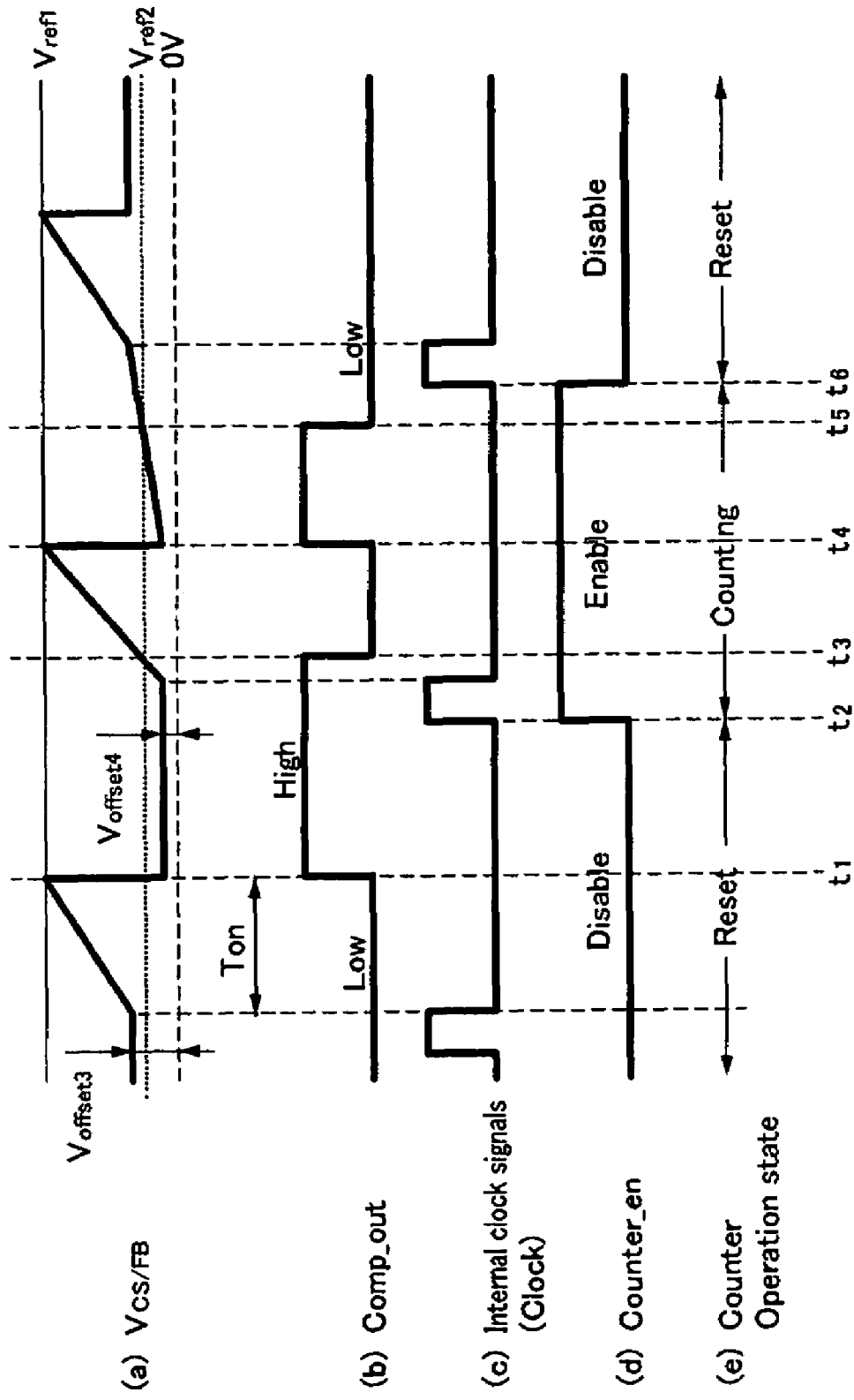

FIG. 3 shows a circuit for performing a protection circuit operation by switching controller 400 according to an embodiment. For clarity, elements other than the circuit for performing the protection circuit operation are not illustrated in FIG. 3.

As shown in FIG. 3, switching controller 400 includes a comparator 420, a D flipflop 440, a counter 460, and a protection circuit 480.

An inverting terminal (+) of comparator 420 is connected to terminal CS/FB of switching controller 400 so that voltage of VCS/FB is input to inverting terminal (−), and a reference voltage Vref2 is input to a corresponding non-inverting terminal (+). Since offset voltage Voffset is almost 0V in the protection circuit condition, reference voltage Vref2 also becomes close to 0V. A data terminal D of D flipflop 440 receives an output signal Comp_out from comparator 420 and a clock signal terminal CK thereof receives internal clock signals. An enable terminal EN of counter 460 receives a signal Counter_en from an output terminal Q of D flipflop 440 and a clock signal terminal CK thereof receives internal clock signals. The internal clock signals input to D flipflop 440 and counter 460 correspond to the internal clock signals described in FIG. 2.

Counter 460 performs a counting operation when a High signal is input to enable terminal EN, and it performs a reset operation when a Low signal is input to enable terminal EN. Through this operation counter 460 transmits information on the counted time to protection circuit 480. Protection circuit 480 receives the information on the counted time from counter 460 and controls a gate drive circuit (not illustrated) to switch off switching MOS transistor Qsw when the counted time exceeds a predetermined time. Various methods can be employed to control the gate drive circuit by protection circuit 480, including that in US Pat. No. 5,687,051, which are known to a person skilled in the art and need not be described in any further detail. FIG. 4 shows signals, or waveforms, of respective circuit elements in switching controller 400 of FIG. 3. Voltage VCS/FB includes current sensing information and feedback information, as described above. Comparator 420 outputs an output signal Comp_out. Comp_out is High when voltage VCS/FB is lower than reference voltage Vref2, and Com_out is Low when voltage VCS/FB is higher than reference voltage Vref2. Therefore, output signal Comp_out is High between t1 and t3, when Voffset=Voffset4<Vref2. Output signal Comp_out is also High between t4 and t5. Output signal Comp_out is Low when offset voltage Voffset=Voffset3>Vref2.

D flipflop 440 outputs a signal Counter_en at output terminal Q. Signal Counter_en is coupled into enable terminal EN of counter 460. Signal Counter_en is High, if output signal Comp_out is High at t2, the rising edge of the internal clock signal. Signal Counter_en switches to Low, if output signal Comp_out is Low at t6, the next rising edge of the internal clock signal. Signal Counter_en assumes the enable (High) state between t2 and t6, as shown in waveform (d) in FIG. 4. Signal Comp_out changes from High to Low when voltage VCS/FB crosses reference voltage Vref2. Signal Counter_en changes from Low to High essentially synchronized with a Clock signal to insure that voltage VCS/FB represents only the offset voltage.

Counter 460 counts the time when signal Counter_en is in the enable (High) state, and resets the time when signal Counter_en is in the disable (Low) state. The interval between t2 and t6 is proportional to the time in which offset voltage Voffset is lower than reference voltage Vref2 in FIG. 4(a), as well as the time in which Counter_en is High in FIG. 4(d).

The counted time is transmitted by counter 460 to protection circuit 480. Protection circuit 480 controls the gate drive circuit (not illustrated) for switching off switching MOS transistor Qsw when the counted time is greater than a predetermined time.

The reason for the protection circuit 480 to perform the protection operation when the counting time is greater than a predetermined time is not to perform the protection operation in the protection circuit operation states such as an overload state, a short circuit state, or an open loop state, but to perform the same when the protection circuit operation state is maintained.

The predetermined time is established so as to protect the SMPS in the protection circuit operation state, and it is established through experimental methods.

As described, the switching controller 400 determines whether the period in which the offset voltage Voffset including feedback information is lower than the reference voltage Vref2 is maintained for a predetermined time frame, and then performs the protection operation.

Various methods can be used to measure the period in which the protection operation condition is maintained. That is, methods for varying an initial value in the next protection operation condition can be used when the period in which the protection operation condition is maintained is shorter than a predetermined time.

FIGS. 5(a)-(d) illustrate the operation of SMPS for a particular waveform of voltage VCS/FB.

FIG. 5(a) illustrates a waveform of the offset voltage of voltage VCS/FB.

Figure 5:
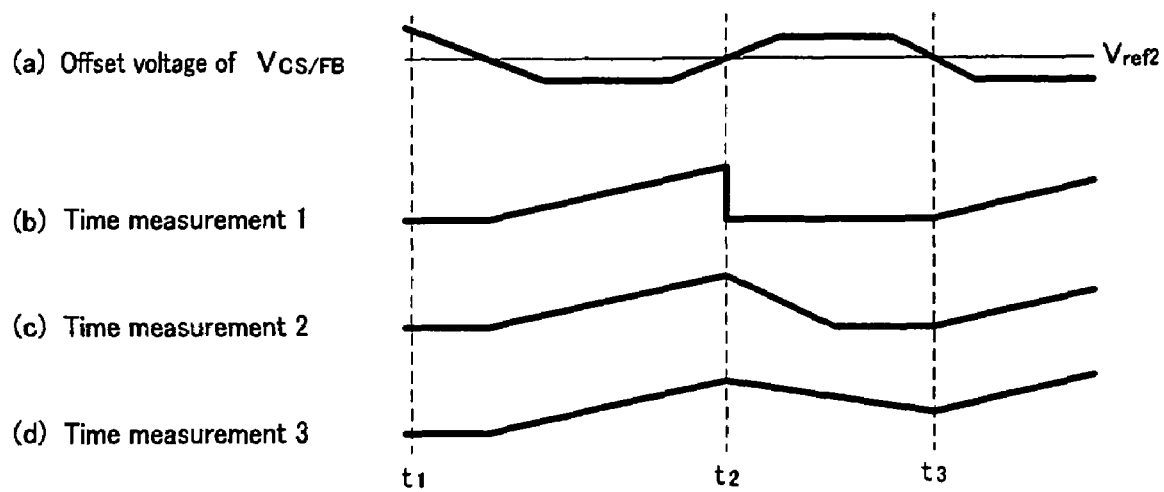

FIGS. 5(b)-(d) illustrate different methods for resetting the time, according to various embodiments. FIG. 5(b) shows that the time counting signal (or "time measurement"), which is an internal signal of counter 460, rises in the t1-t2 interval, when the offset voltage of VCS/FB is lower than reference voltage Vref2. The time counting signal is reset at time t2, when the offset voltage of VCS/FB is higher than Vref2 counted time is shorter than a predetermined time. The time measurement signal changes its direction at the nearest clock signal after the offset voltage of VCS/FB crosses Vref2. FIG. 5 illustrates the various reset methods of the time measurement circuit. The clock signal is not shown in FIG. 5. The time measurement signal is essentially synchronized with the clock signal.

FIG. 5(c) shows that the time measurement (or measured time) can be reduced quickly without resetting the measured time at t2. As shown by the waveform of FIG. 5(d), the measured time can also be reduced gradually. The initial value for measuring time is varied at the next protection circuit operation condition that is, at the time t3 according to the various methods shown in FIGS. 5(b)-(d).

FIG. 5(d) shows that the initial value is given at t3 and the protection operation can be performed in the shorter protection circuit operation condition.

According to the present invention, the number of terminals can be reduced by receiving current sensing information and feedback information through a single terminal and performing a protection operation, and residual terminals can be applied to provide various functions including a soft start function and a frequency setting function by reducing the number of terminals.

While this invention has been described in connection with certain specific embodiments, it is understood that the invention is not limited to the disclosed embodiments, but, on the contrary, is intended to cover various modifications and equivalent arrangements included within the spirit and scope of the appended claims.

What is claimed is:

1. A switching mode power supply comprising:
   a power supply including a main switch coupled to a primary coil of a transformer, operable to supply power to a secondary coil of the transformer according to an operation of the main switch;
   a feedback circuit, operable to generate feedback information corresponding to an output voltage, output by an output unit including the secondary coil of the transformer; and
   a switching controller, operable
      to receive current sensing information on the current flowing through the main switch and the feedback information through a single terminal; and
      to perform a protection operation when the voltage at the single terminal is maintained below a reference voltage for more than a first time period, wherein the switching controller comprises:
   a comparator, operable to compare the voltage at the single terminal and the reference voltage, to output a first signal level when the voltage at the single terminal is lower than the reference voltage, and to output a second signal level when the voltage at the single terminal is higher than the reference voltage;
   a D flipflop, operable to receive an output of the comparator through a data terminal, and to receive clock signals through a clock signal terminal;
   a counter, operable to receive an output of the D flipflop through an enable terminal, and to count the time during which the input signal is in the enable state; and
   a protection circuit, operable to receive information on the counted time from the counter, and performing a protection operation when the counted time is greater than a second time.

2. The switching mode power supply of claim 1, wherein the feedback information has voltage information in inverse proportion to a load.

3. The switching mode power supply of claim 1, further comprising a first capacitor connected between the single terminal and a ground, a voltage at the single terminal being applied to the first capacitor.

4. The switching mode power supply of claim 1, wherein the counted time is in proportion to the period in which the voltage at the terminal is lower than the reference voltage.

5. The switching mode power supply of claim 1, wherein the feedback circuit comprises:
   a first resistor having a first terminal connected to the output unit;
   a second resistor electrically connected between a second terminal of the first resistor and the ground;
   a shunt regulator having a reference terminal connected to the second terminal of the first resistor and an anode terminal electrically connected to the ground;
   a second capacitor having a first terminal electrically connected to the second terminal of the first resistor, and a second terminal electrically connected to a cathode of the shunt regulator;
   a third resistor having a first terminal electrically connected to the output unit;
   a photodiode having an anode connected to a second terminal of the third resistor, and a cathode electrically connected to the cathode of the shunt regulator;
   a phototransistor for forming a photocoupler together with the photodiode; and
   a fourth resistor being electrically connected between the phototransistor and the terminal, and transmitting the current flowing through the phototransistor to the terminal.

6. The switching mode power supply of claim 5, further comprising:
   a fifth resistor being electrically connected to the main switch and sensing the current flowing through the main switch; and
   a sixth resistor electrically connected between the terminal and a node of the fifth resistor and the main switch,
   wherein the current sensing information is generated by the fifth resistor and the sixth resistor.

7. The switching mode power supply of claim 1, wherein:
   the switching controller is configured to generate the voltage of the single terminal to rise for a rise time and to decrease for a decrease time, wherein the rise time is longer than the decrease time.

8. The switching mode power supply of claim 1, wherein:
   wherein the comparator is coupled to the counter through the D flipflop.

9. A switching mode power supply comprising:
   a power supply including a main switch coupled to a primary coil of a transformer, operable to supply power to a secondary coil of the transformer according to an operation by the main switch;
   a feedback circuit, operable to generate feedback information corresponding to an output voltage output by an output unit including the secondary coil of the transformer; and
   a switching controller to receive current sensing information on the current flowing through the main switch and the feedback information through a single terminal, and to perform a protection operation if a first period is longer than a predetermined time, wherein the first period is a period in which a first voltage corresponding to the feedback information is below a reference voltage, wherein the switching controller comprises:
   a comparator, operable to compare the voltage at the single terminal and the reference voltage, to output a first signal level when the voltage at the single terminal is lower than the reference voltage, and to output a second signal level when the voltage at the single terminal is higher than the reference voltage;

a D flipflop, operable to receive an output of the comparator through a data terminal, and to receive clock signals through a clock signal terminal;

a counter, operable to receive an output of the D flipflop through an enable terminal, and to count the time during which the input signal is in the enable state; and a protection circuit, operable to receive information on the counted time from the counter, and performing a protection operation when the counted time is greater than a second time.

10. The switching mode power supply of claim 9, wherein the first voltage is in inverse proportion to a load.

11. The switching mode power supply of claim 9, wherein the switching controller resets an information of the first period if the first period is shorter than the predetermined time.

12. The switching mode power supply of claim 9, wherein the switching controller gradually reduces an information of the first period if the first period is shorter than the predetermined time.

13. A method for performing a protection operation in a switching mode power supply including a main switch coupled to a primary coil of a transformer, a switching controller, operable to control the operation of the main switch, and an output unit, operable to output a predetermined output voltage according to the operation of the main switch, the method comprising:

measuring current sensing information corresponding to the current flowing through the main switch, and feedback information corresponding to the output voltage;

receiving the current sensing information and the feedback information through a terminal of the switching controller combined into a terminal voltage comparing the terminal voltage with a reference voltage, and determining whether the terminal voltage is lower than the reference voltage for a first period which is longer than a predetermined time; and performing a protection operation when the first period is determined to be longer than the predetermined time, wherein a voltage of the terminal is the sum of an offset voltage corresponding to the feedback information and a sawtooth voltage with a slope corresponding to a current sensing information.

14. The method of claim 13, wherein the feedback information has voltage information in inverse proportion to a load.

15. The method of claim 13, wherein the switching mode power supply further comprises a capacitor electrically connected between the terminal and a ground, and the terminal voltage at the terminal is charged in the capacitor.

* * * * *